US011622391B2

(12) United States Patent
Taherzadeh Boroujeni et al.

(10) Patent No.: US 11,622,391 B2
(45) Date of Patent: Apr. 4, 2023

(54) BEAM-BASED RANDOM ACCESS OCCASIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/450,223

(22) Filed: Oct. 7, 2021

(65) Prior Publication Data

US 2022/0124831 A1    Apr. 21, 2022

Related U.S. Application Data

(60) Provisional application No. 63/092,734, filed on Oct. 16, 2020.

(51) Int. Cl.
*H04W 74/08* (2009.01)
*H04W 72/044* (2023.01)

(52) U.S. Cl.
CPC ..... *H04W 74/0841* (2013.01); *H04W 72/046* (2013.01); *H04W 74/0866* (2013.01)

(58) Field of Classification Search
CPC ... H04B 7/0695; H04B 7/088; H04W 72/046; H04W 74/006; H04W 74/0833; H04W 74/0841; H04W 74/0866
See application file for complete search history.

(56) References Cited

U.S. PATENT DOCUMENTS 10,405,353 B2 *   9/2019   Guo ................... H04W 56/001
2018/0279379 A1 *   9/2018   Tsai .................... H04W 16/28
(Continued)

OTHER PUBLICATIONS

CATT: "Further Details on NR 4-Step RA Procedure", 3GPP TSG RAN WG1 Meeting NR#3, 3GPP Draft, R1-1715790, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, 13 Pages, Sep. 17, 2017 (Sep. 17, 2017), XP051339250, Retrieved from the Internet: URL: http://www.3gpp.org/ftp/Meetings_3GPP_SYNC/RAN1/Docs/ [retrieved on Sep. 17, 2017] section 2.3.

(Continued)

*Primary Examiner* — Kashif Siddiqui
(74) *Attorney, Agent, or Firm* — Harrity & Harrity

(57) ABSTRACT

Various aspects of the present disclosure generally relate to wireless communication. In some aspects, a user equipment (UE) may receive, from a base station, a message that indicates a plurality of subsets within a set of random access occasions. Each subset of the plurality of subsets may be associated with a corresponding beam of a plurality of beams, and each corresponding beam may be different from remaining beams of the plurality of beams. Accordingly, the UE may transmit, to the base station and based at least in part on the message, at least one random access preamble. The at least one random access preamble is transmitted within one or more subsets, of the plurality of subsets, using one or more corresponding beams of the plurality of beams. Numerous other aspects are described.

30 Claims, 11 Drawing Sheets

(56) References Cited

U.S. PATENT DOCUMENTS

| | | | | |
|---|---|---|---|---|
| 2020/0100297 | A1* | 3/2020 | Agiwal | H04W 52/50 |
| 2020/0351853 | A1* | 11/2020 | Xiong | H04W 74/006 |
| 2021/0243811 | A1* | 8/2021 | Nam | H04W 74/0833 |
| 2021/0352466 | A1* | 11/2021 | Hu | H04W 74/0833 |
| 2022/0191940 | A1* | 6/2022 | MolavianJazi | H04B 17/318 |

OTHER PUBLICATIONS

Huawei, et al., "RACH Procedures and Resource Configuration", 3GPP Draft, R1-1701724, 3GPP TSG RAN WG1 Meeting #88, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 6, 2017 (Feb. 6, 2017), XP051220589, pp. 1-7, Retrieved from the Internet: URL: http://www.3gpp.org/ftp/tsg_ran/WG1_RL1/TSGR1_88/Docs/ [retrieved on Feb. 6, 2017] Paragraph [0002] the whole document.

International Search Report and Written Opinion—PCT/US2021/071799—ISA/EPO—dated Jan. 26, 2022.

* cited by examiner

BEAM-BASED RANDOM ACCESS OCCASIONS

CROSS-REFERENCE TO RELATED APPLICATION

This Patent Application claims priority to U.S. Provisional Patent Application No. 63/092,734, filed on Oct. 16, 2020, entitled "RANDOM ACCESS OCCASION BUNDLING," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for random access occasion bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive, from a base station, a message that indicates a plurality of subsets within a set of random access occasions, wherein each subset of the plurality of subsets is associated with a corresponding beam of a plurality of beams, wherein each corresponding beam is different from remaining beams of the plurality of beams. The one or more processors may be further configured to transmit, to the base station and based at least in part on the message, at least one random access preamble, wherein the at least one random access preamble is transmitted within one or more subsets, of the plurality of subsets, using one or more corresponding beams of the plurality of beams.

Some aspects described herein relate to an apparatus for wireless communication at a base station. The apparatus may include a memory and one or more processors coupled to the memory. The one or more processors may be configured to transmit, to a UE, a message that indicates a plurality of subsets within a set of random access occasions, wherein each subset of the plurality of subsets is associated with a corresponding beam of a plurality of beams, wherein each corresponding beam is different from remaining beams of the plurality of beams. The one or more processors may be further configured to receive, from the UE and based at least in part on the message, at least one random access preamble, wherein the at least one random access preamble is received within one or more subsets, of the plurality of subsets, using one or more corresponding beams of the plurality of beams.

Some aspects described herein relate to a method of wireless communication performed by a UE. The method may include receiving, from a base station, a message that indicates a plurality of subsets within a set of random access occasions, wherein each subset of the plurality of subsets is associated with a corresponding beam of a plurality of beams, wherein each corresponding beam is different from remaining beams of the plurality of beams. The method may further include transmitting, to the base station and based at least in part on the message, at least one random access preamble, wherein the at least one random access preamble is transmitted within one or more subsets, of the plurality of subsets, using one or more corresponding beams of the plurality of beams.

Some aspects described herein relate to a method of wireless communication performed by a base station. The method may include transmitting, to a UE, a message that indicates a plurality of subsets within a set of random access occasions, wherein each subset of the plurality of subsets is associated with a corresponding beam of a plurality of beams, wherein each corresponding beam is different from remaining beams of the plurality of beams. The method may further include receiving, from the UE and based at least in part on the message, at least one random access preamble, wherein the at least one random access preamble is received within one or more subsets, of the plurality of subsets, using one or more corresponding beams of the plurality of beams.

Some aspects described herein relate to a non-transitory computer-readable medium that stores a set of instructions for wireless communication by a UE. The set of instructions, when executed by one or more processors of the UE, may cause the UE to receive, from a base station, a message that indicates a plurality of subsets within a set of random access occasions, wherein each subset of the plurality of subsets is associated with a corresponding beam of a plurality of beams, wherein each corresponding beam is different from remaining beams of the plurality of beams. The set of instructions, when executed by one or more processors of the UE, may further cause the UE to transmit, to the base station and based at least in part on the message, at least one random access preamble, wherein the at least one random access preamble is transmitted within one or more subsets, of the plurality of subsets, using one or more corresponding beams of the plurality of beams.

Some aspects described herein relate to a non-transitory computer-readable medium that stores a set of instructions for wireless communication by a base station. The set of instructions, when executed by one or more processors of the base station, may cause the base station to transmit, to a UE, a message that indicates a plurality of subsets within a set of random access occasions, wherein each subset of the plurality of subsets is associated with a corresponding beam of a plurality of beams, wherein each corresponding beam is different from remaining beams of the plurality of beams. The set of instructions, when executed by one or more processors of the base station, may further cause the base station to receive, from the UE and based at least in part on the message, at least one random access preamble, wherein the at least one random access preamble is received within one or more subsets, of the plurality of subsets, using one or more corresponding beams of the plurality of beams.

Some aspects described herein relate to an apparatus for wireless communication. The apparatus may include means for receiving, from a base station, a message that indicates a plurality of subsets within a set of random access occasions, wherein each subset of the plurality of subsets is associated with a corresponding beam of a plurality of beams, wherein each corresponding beam is different from remaining beams of the plurality of beams. The apparatus may further include means for transmitting, to the base station and based at least in part on the message, at least one random access preamble, wherein the at least one random access preamble is transmitted within one or more subsets, of the plurality of subsets, using one or more corresponding beams of the plurality of beams.

Some aspects described herein relate to an apparatus for wireless communication. The apparatus may include means for transmitting, to a UE, a message that indicates a plurality of subsets within a set of random access occasions, wherein each subset of the plurality of subsets is associated with a corresponding beam of a plurality of beams, wherein each corresponding beam is different from remaining beams of the plurality of beams. The apparatus may further include means for receiving, from the UE and based at least in part on the message, at least one random access preamble, wherein the at least one random access preamble is received within one or more subsets, of the plurality of subsets, using one or more corresponding beams of the plurality of beams.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
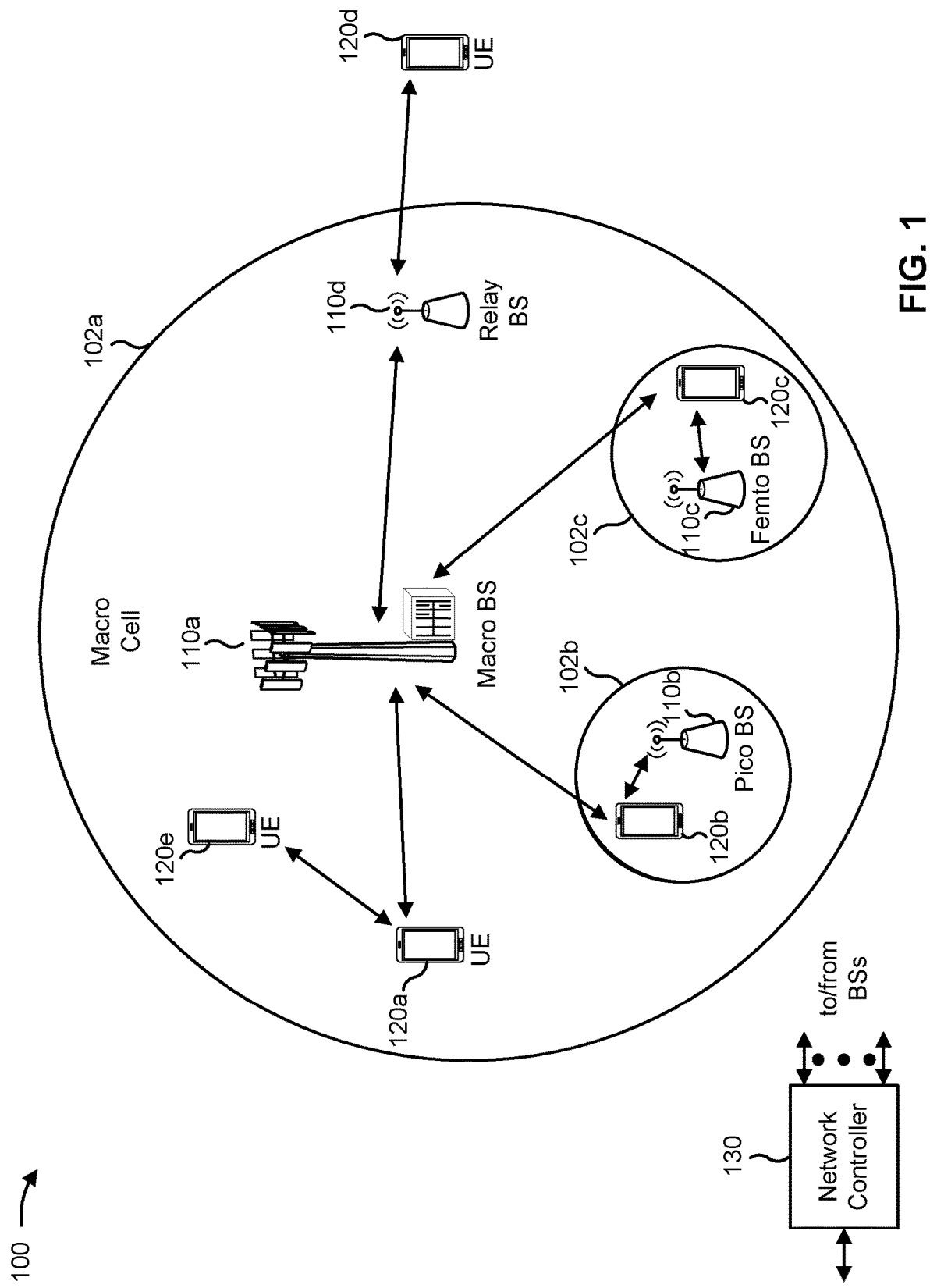
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" or "mmW" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or "mmW" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1. In some aspects, the wireless network 100 may further include one or more wired components. For example, one or more UEs 120 may receive data over-the-air as well as via wired connection and combine the packets received to increase throughput.

Figure 2:
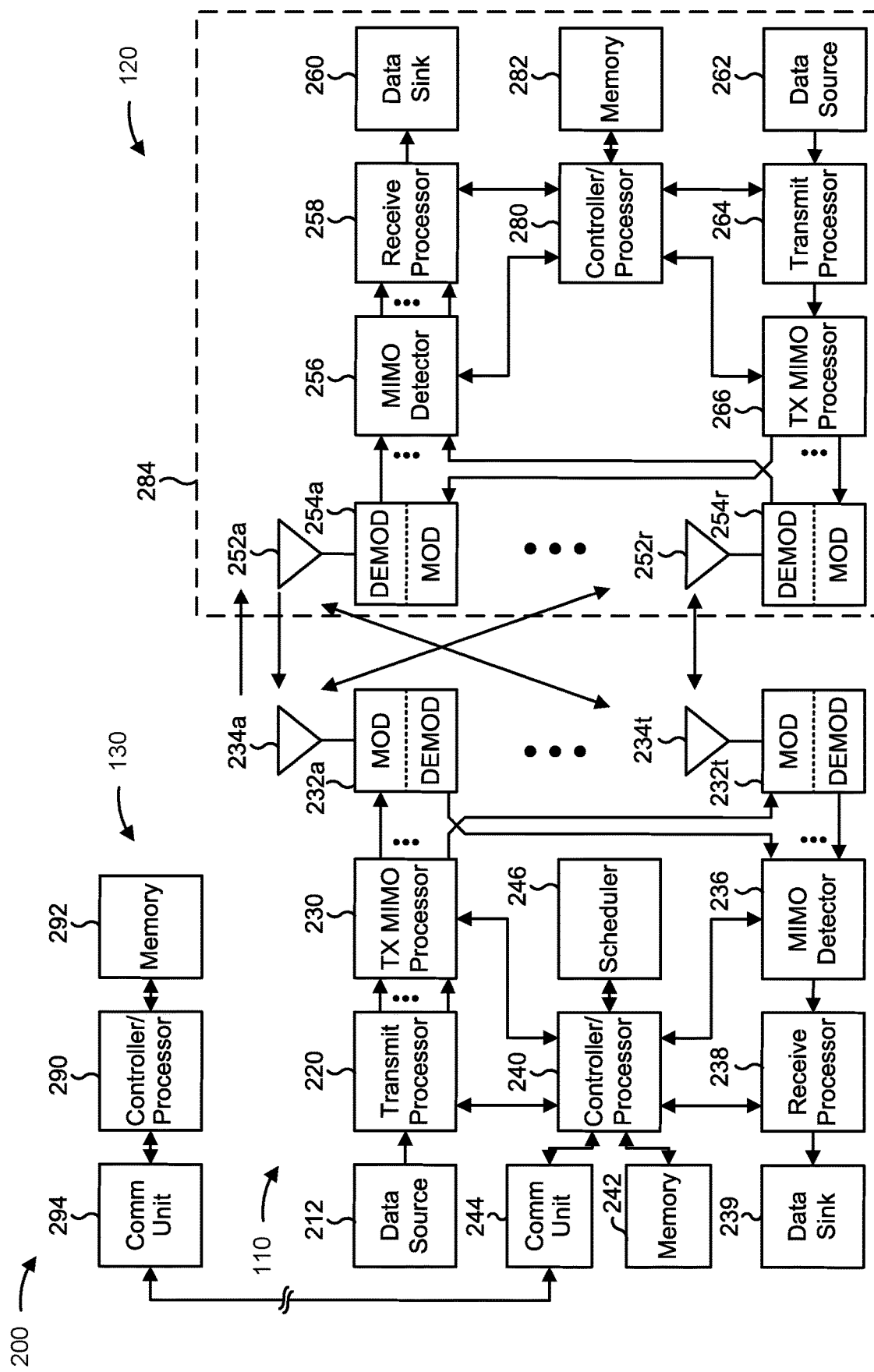
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with random access occasion bundling, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120 and/or apparatus 1000 of FIG. 10) may include means for receiving, from a base station (e.g., base station 110 and/or apparatus 1100 of FIG. 11), a message that indicates a plurality of subsets within a set of random access occasions, wherein each subset of the plurality of subsets is associated with a corresponding beam of a plurality of beams, wherein each corresponding beam is different from remaining beams of the plurality of beams; and/or means for transmitting, to the base station and based at least in part on the message, at least one random access preamble, wherein the at least one random access preamble is transmitted within one or more subsets, of the plurality of subsets, using one or more corresponding beams of the plurality of beams. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., base station 110 and/or apparatus 1100 of FIG. 11) may include means for transmitting, to a UE (e.g., UE 120 and/or apparatus 1000 of FIG. 10), a message that indicates a plurality of subsets within a set of random access occasions, wherein each subset of the plurality of subsets is associated with a corresponding beam of a plurality of beams, wherein each corresponding beam is different from remaining beams of the plurality of beams; and/or means for receiving, from the UE and based at least in part on the message, at least one random access preamble, wherein the at least one random access preamble is received within one or more subsets, of the plurality of subsets, using one or more corresponding beams of the plurality of beams. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2. In some aspects, the hardware depicted in FIG. 2 may be integrated (e.g., the controller/processor 240 integrated at least in part with memory 242, the controller/processor 280 integrated at least in part with memory 282, and so on). In some aspects, the hardware depicted in FIG. 2 may be separated (e.g., functions of transmit processor 220, TX MIMO processor 230, modulator 232, antenna 234, demodulator 232, MIMO detector 236, receive processor 238, controller/processor 240, memory 242, and/or scheduler 246 may be conceptually, virtually, and/or physically divided between a central unit (CU) and a distributed unit (DU)).

Figure 3:
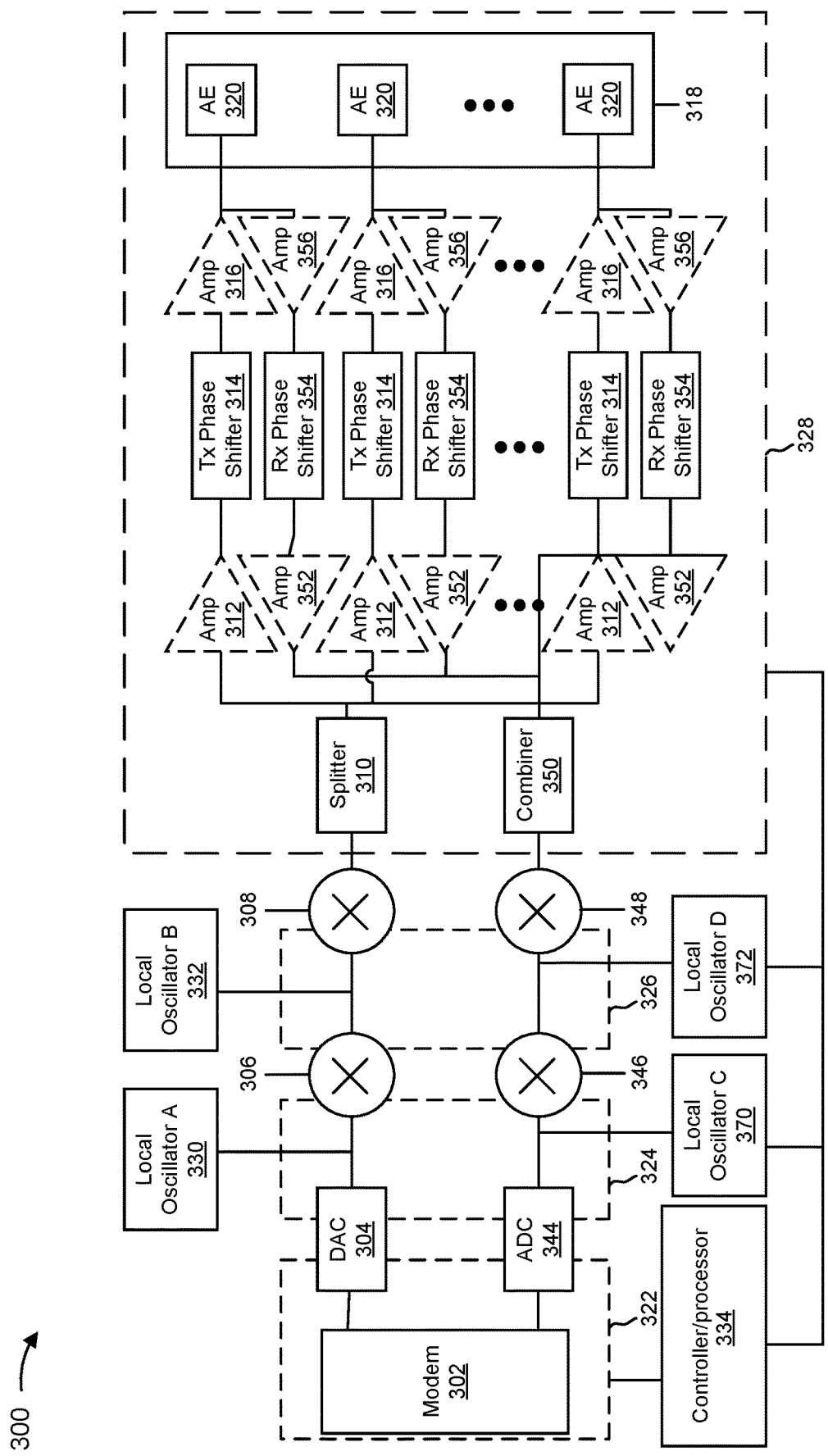
FIG. 3 is a diagram illustrating an example of beamforming architecture that supports beamforming for millimeter wave (mmW) communications, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain.

When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first amplifiers 312 and/or the second amplifiers 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3. In some aspects, the beamforming architecture 300 may include additional components, such as dielectric walls and/or other components that assist in constructive and destructive interferences that contribute to formation of beams.

Figure 4:
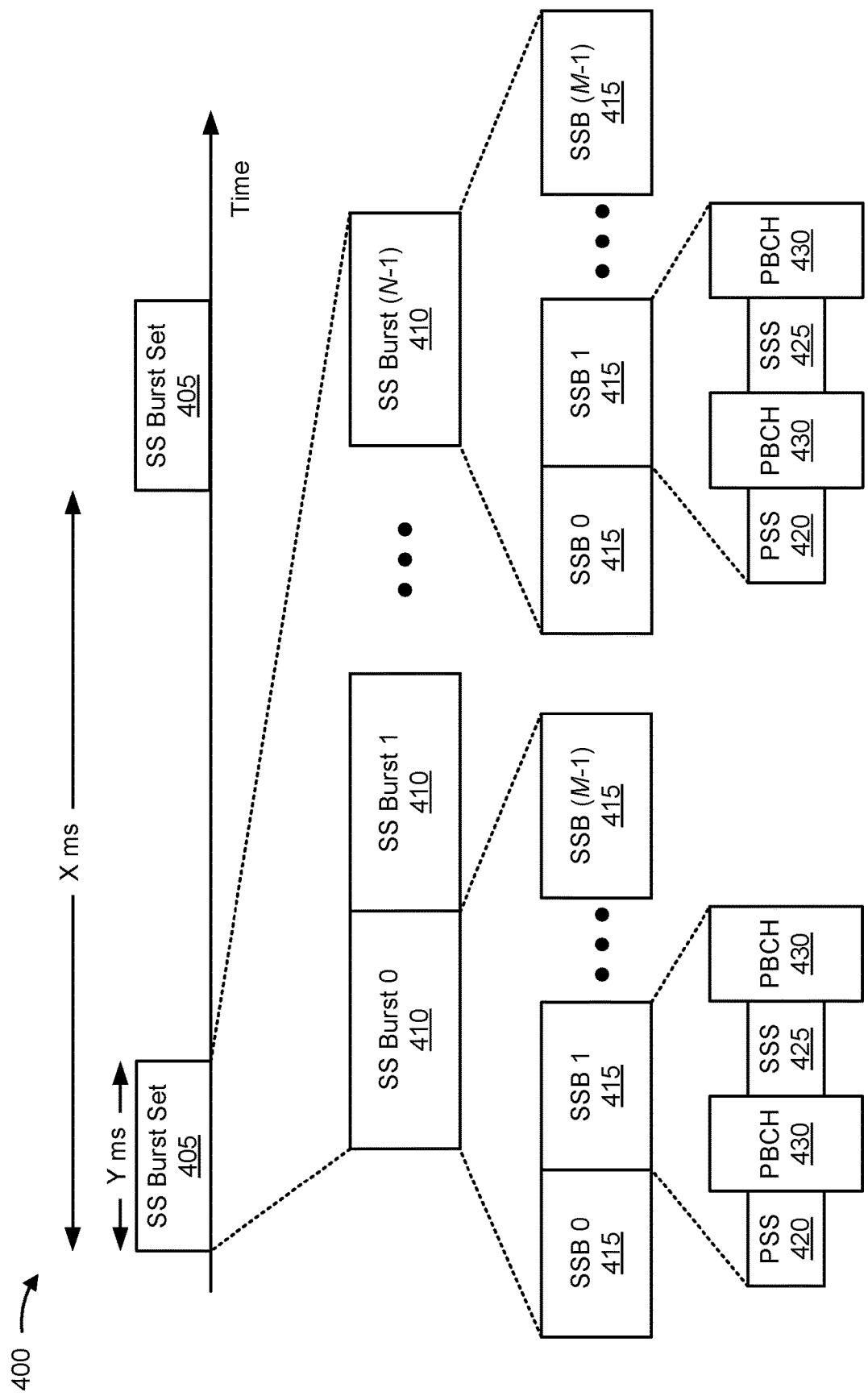
FIG. 4 is a diagram illustrating an example of synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4. In some aspects, the PBCH may include a DMRS and/or a payload including a master information block (MIB).

Figure 5:
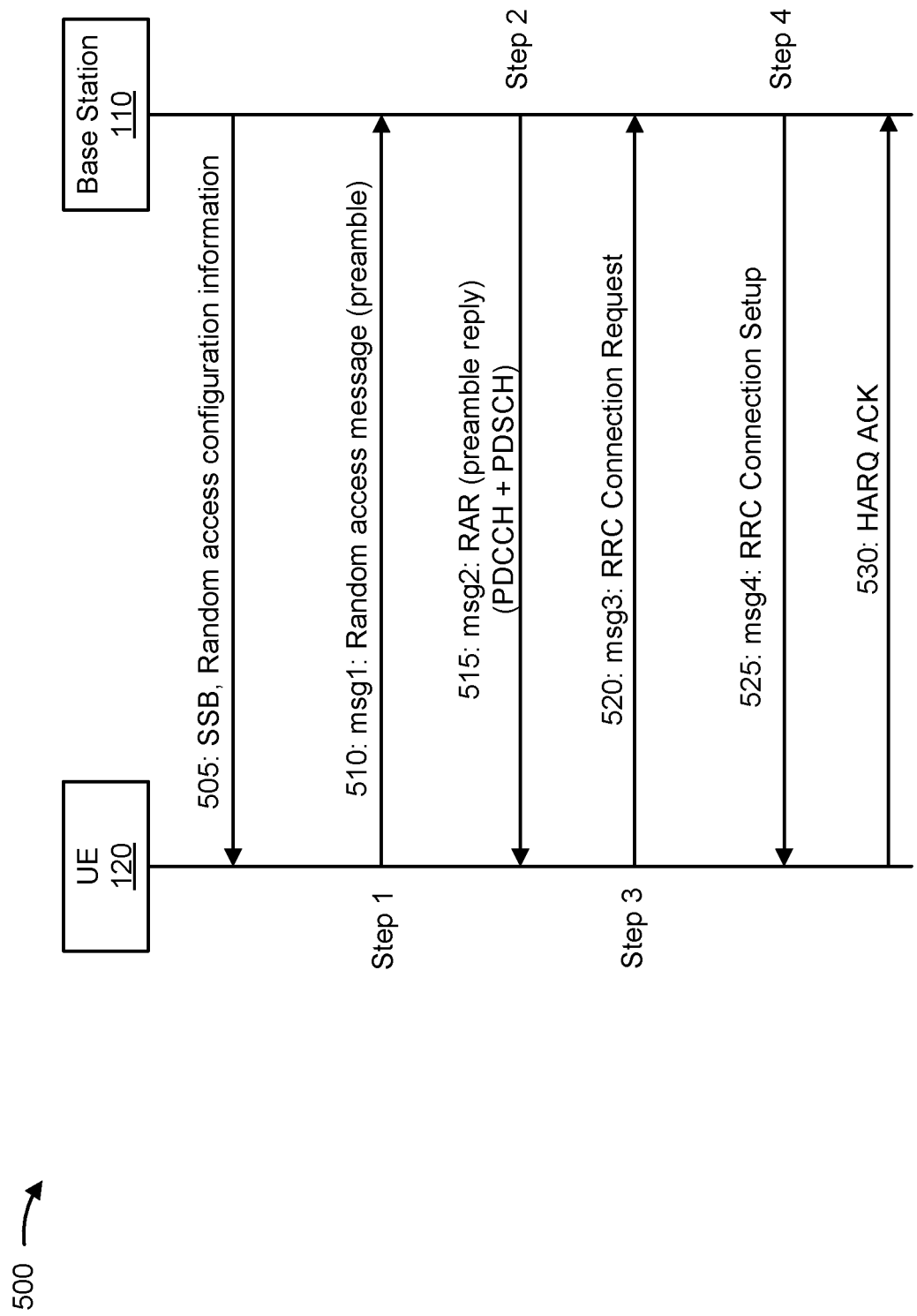
FIG. 5 is a diagram illustrating an example of a four-step random access procedure, in accordance with the present disclosure.

FIG. 5 is a diagram illustrating an example of a four-step random access procedure, in accordance with the present disclosure. As shown in FIG. 5, a base station 110 and a UE 120 may communicate with one another to perform the four-step random access procedure.

As shown by reference number 505, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 510, the UE 120 may transmit a RAM, which may include a preamble (sometimes referred to as a random access preamble, a physical RACH (PRACH) preamble, or a RAM preamble). The message that includes the preamble may be referred to as a message 1, msg1, MSG1, a first message, or an initial message in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 525, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a hybrid automatic repeat request (HARD) acknowledgement (ACK).

As indicated above, FIG. 5 is provided as an example. Other examples may differ from what is described with regard to FIG. 5. In some aspects, other examples may use a two-step random access procedure.

A UE and/or a base station may perform beamforming (e.g., using hardware as described in connection with FIG. 3) when wirelessly communicating. In some situations, the UE and/or the base station may experience reduced signal power when using mmW and/or other radio frequencies (e.g., FR2 and/or other frequencies). Accordingly, the UE and/or the base station may perform beam refinement, in which the UE and/or the base station selects a subbeam within a selected beam (e.g., a narrower subbeam within the selected beam), in order to increase signal power. The UE and/or the base station may perform beam refinement for transmissions (e.g., by selecting a subbeam that can be transmitted at higher power) and/or for receptions (e.g., by selecting a reception filter that is narrower than a reception filter used to receive transmissions on the selected beam).

Some techniques and apparatuses described herein allow a base station (e.g., base station 110) to configure a set of random access occasions for a UE (e.g., UE 120) into a plurality of subsets such that each subset of random access occasions is associated with a corresponding beam. Each corresponding beam is also different from remaining beams of the plurality of beams. Accordingly, the UE 120 may perform beam refinement (e.g., by selecting a subbeam that can be transmitted at higher power) across subsets. The UE 120 may therefore increase reliability and quality of transmissions to the base station 110. Additionally, or alternatively, the base station 110 may perform beam refinement (e.g., by selecting a reception filter that is narrower) within subsets. The base station 110 may perform accurate beam refinement because the UE 120 transmits within each subset using the same corresponding beam. The base station 110 may therefore increase reliability and quality of receptions at the base station 110.

Figure 6:
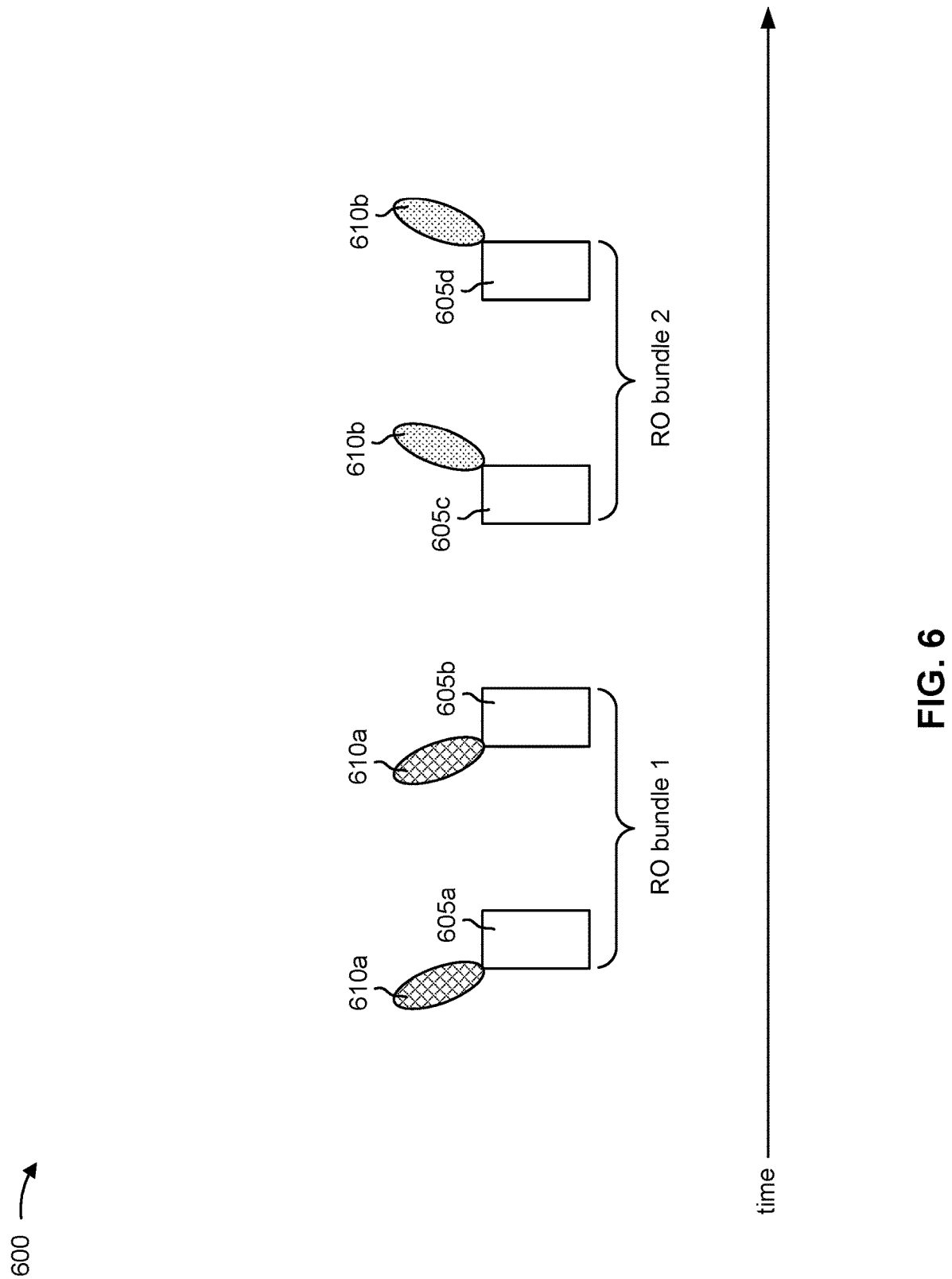
FIGS. 6 and 7 are diagrams illustrating examples associated with random access occasion bundling, in accordance with the present disclosure.

FIG. 6 is a diagram illustrating an example 600 associated with random access occasion bundling, in accordance with the present disclosure. As shown in FIG. 6, example 600 includes a set of random access occasions 605a, 605b, 605c, and 605d (also referred to as "ROs"). A random access occasion may comprise one or more resources in time (e.g., one or more symbols across one or more slots of one or more radio frames) during which a UE (e.g., UE 120) may transmit a random access preamble (e.g., as described in connection with FIG. 5) to a base station (e.g., base station 110). In some aspects, the set may include at least two random access occasions.

In some aspects, the set may be periodic. For example, the set may include one or more random access occasions that repeat in time according to one or more periodicities. In some aspects, the set may be periodic without end (e.g., until the base station 110 reconfigures the set, such as with an RRC message). As an alternative, the set may end after one of the random access occasions or after a quantity of periods have occurred. In some aspects, the set may include a finite number of random access occasions that are not periodic.

As further shown in FIG. 6, the set of random access occasions may be divided into a plurality of subsets (also referred to as "RO bundles"). For example, the base station 110 may transmit, and the UE 120 may receive, a message indicating the plurality of subsets. In some aspects, the message may include an RRC message, a remaining minimum system information (RMSI) message, and/or another message. Each subset of the plurality of subsets may be associated with a corresponding beam (e.g., formed using hardware as described in connection with FIG. 3) of a plurality of beams, and each corresponding beam may be different from remaining beams of the plurality of beams. In example 600, a first subset ("RO bundle 1") is associated with beam 610a, and a second subset ("RO bundle 2") is associated with beam 610b. Additionally, or alternatively, each subset of the plurality of subsets may be associated with a corresponding synchronization signal (e.g., an SSB as described in connection with FIG. 4) of a plurality of synchronization signals, and each corresponding synchronization signal may be different from remaining synchronization signals of the plurality of synchronization signals. In some aspects, each synchronization signal of the plurality of synchronization signals may be associated with a corresponding beam of the plurality of beams, and each corresponding beam may be different from remaining beams of the plurality of beams. Accordingly, the UE 120 may select one of the plurality of beams by, for example, selecting a corresponding one of the plurality of synchronization signals.

In some aspects, the plurality of subsets may be distinct from one or more subsets associated with legacy UEs. For example, the legacy UEs may include one or more UEs that are not configured for bundling random access occasions (e.g., as described above), that do not include hardware for beamforming (e.g., as described in connection with FIG. 3), and/or are otherwise not configured to perform (e.g., not programmed to perform and/or do not include hardware capable of performing) beam refinement.

In some aspects, each subset of the plurality of subsets may be associated with a corresponding beam of the plurality of beams according to a rule stored in a memory of the UE 120 and/or the base station 110. For example, the rule may be set forth in 3GPP specifications and/or another standard. Additionally, or alternatively, each subset of the plurality of subsets may be associated with a corresponding beam of the plurality of beams according to a rule indicated by the message from the base station 110. For example, a set of random access occasions may be divided into subsets, where each subset includes a quantity of consecutive random access occasions that can be represented by a variable k, where the variable is indicated by the message. In one example, when the set of random access occasions includes six random access occasions, the base station 110 may indicate that k=2 such that the set is divided into three subsets, where each subset includes two random access occasions that are consecutive in time. In another example, when the set of random access occasions includes six random access occasions that repeated in time according to a periodicity, the base station 110 may indicate that k=3 such that the set is divided into two subsets, where each subset includes three random access occasions that are consecutive in time, and the subsets repeat in time according to the periodicity.

Based at least in part on the message from the base station 110, the UE 120 may transmit at least one random access preamble within one or more subsets, of the plurality of subsets, using one or more corresponding beams of the plurality of beams. Accordingly, the UE 120 may select a beam to form (e.g., using hardware as described in connection with FIG. 3), for transmitting a random access preamble, based at least in part on which subset, of the plurality of subsets, within which the UE 120 transmits the random access preamble.

In some aspects, the UE 120 may transmit a plurality of random access preambles across random access occasions that are included within one subset, of the plurality of subsets. The plurality of random access preambles may be duplicates of a same random access preamble or otherwise associated with each other (e.g., each random access preamble including one or more portions of data that link the preamble to remaining preambles of the plurality of random access preambles). Accordingly, the base station 110 may perform beam refinement (e.g., by narrowing a reception filter) based at least in part on the plurality of random access preambles transmitted within one subset. The base station 110 may perform the refinement because the UE 120 will transmit the plurality of random access preambles using a same beam that corresponds to the one subset. For example, as shown in FIG. 6, the UE 120 transmits random access preambles in random access occasions 605a and 605b with the same beam 610a. In some aspects, the UE 120 may transmit the plurality of random access preambles, across random access occasions that are included within the one subset, based at least in part on an indication, from the base station 110, to repeat transmissions. The indication may be included in the message from the base station 110 or included in a separate message. Additionally, or alternatively, the indication may be included in an RRC message, RMSI, and/or another message.

Additionally, or alternatively, the UE 120 may transmit a plurality of random access preambles across random access occasions that are included in different subsets of the plurality of subsets. The plurality of random access preambles may be duplicates of a same random access preamble or otherwise associated with each other (e.g., each random access preamble including one or more portions of data that links the preamble to remaining preambles of the plurality of random access preamble). Accordingly, the UE 120 may perform beam refinement (e.g., by sweeping subbeams) based at least in part on the plurality of random access preambles transmitted across different subsets. The UE 120 may perform the refinement because the base station 110 is not expecting the UE 120 to transmit the plurality of random access preambles across different subsets using a same beam. For example, as shown in FIG. 6, the UE 120 transmits random access preambles in random access occasions 605*a* and 605*c* (or in random access occasions 605*b* and 605*d* and/or another combination of random access occasions across subsets) using different beams (e.g., beams 610*a* and 610*b*, respectively).

In some aspects, a legacy UE may transmit, and the base station 110 may receive, an additional random access preamble. Accordingly, the base station 110 may receive from the UE 120 and the legacy UE using a combination of a subbeam, based at least in part on one or more corresponding beams used by the UE 120, with a beam associated with the additional random access preamble. For example, the base station 110 may perform beam refinement (e.g., as described above), based at least in part on random access preambles transmitted by the UE 120, to determine the subbeam to use for the UE 120. The base station 110 may combine the determined subbeam with the beam used by the legacy UE to determine a reception filter to use such that the base station 110 can receive from both the UE 120 and the legacy UE.

By using techniques as described in connection with FIG. 6, the UE 120 can perform beam refinement (e.g., by selecting a subbeam that can be transmitted at higher power) across subsets. The UE 120 therefore increases reliability and quality of transmissions to the base station 110. Additionally, or alternatively, the base station 110 can perform beam refinement (e.g., by selecting a reception filter that is narrower) within subsets. The base station 110 therefore increases reliability and quality of receptions at the base station 110.

As indicated above, FIG. 6 is provided as an example. Other examples may differ from what is described with respect to FIG. 6. In some aspects, other examples may include additional random access occasions (e.g., more than four) or fewer random access occasions (e.g., two or three). Additionally, or alternatively, other examples may also include additional subsets and thus additional corresponding beams (e.g., more than two).

Figure 7:
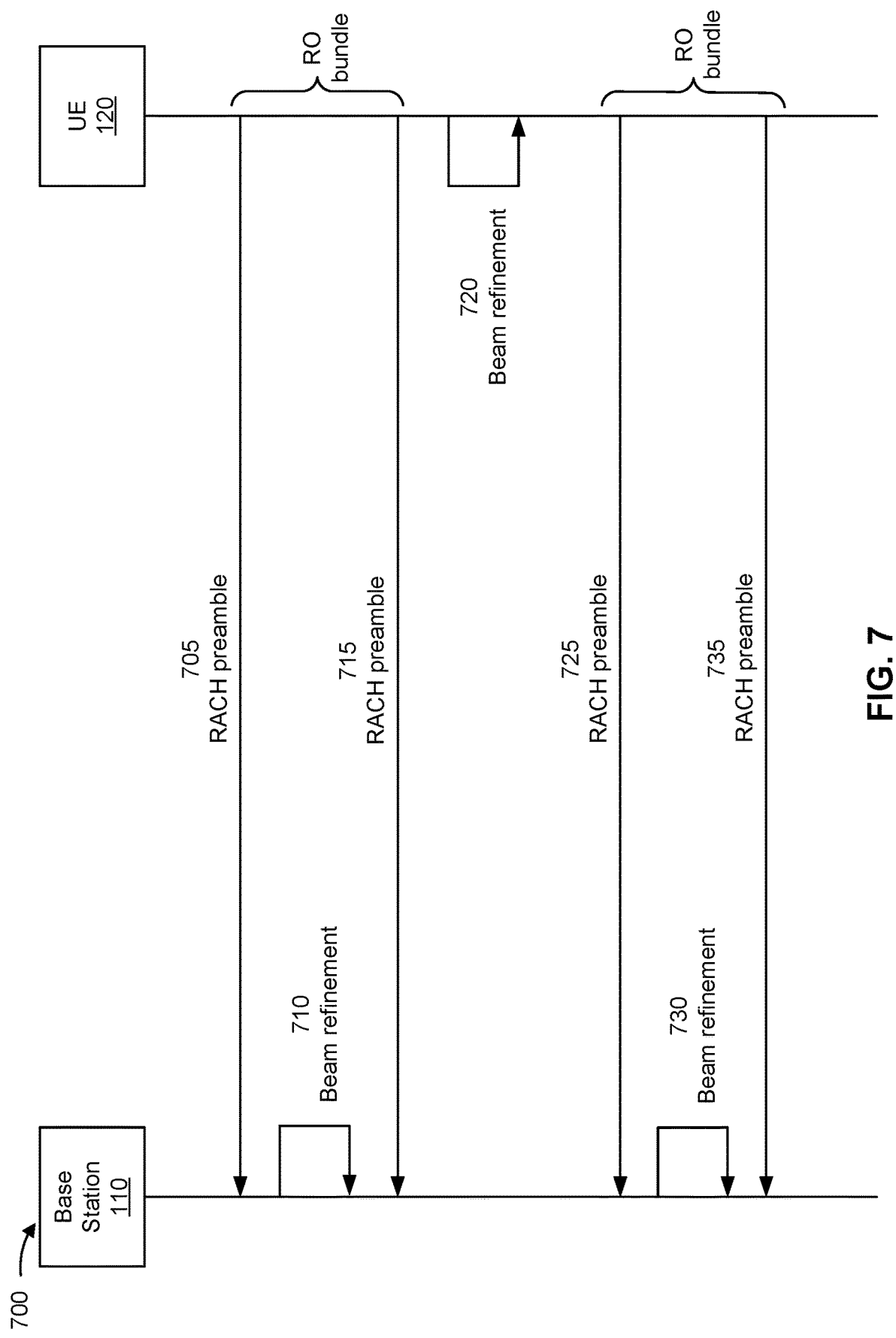

FIG. 7 is a diagram illustrating an example 700 associated with random access occasion bundling, in accordance with the present disclosure. As shown in FIG. 7, example 700 includes communication between a base station 110 and a UE 120. In some aspects, the base station 110 and the UE 120 may be included in a wireless network, such as wireless network 100.

In some aspects, as described in connection with FIG. 6, the base station 110 may configure a set of random access occasions that are divided into a plurality of subsets (also referred to as "RO bundles"). For example, the base station 110 may transmit, and the UE 120 may receive, one or more messages (e.g., RRC messages, RMSI, and/or other messages) that indicate the set of random access occasions and the plurality of subsets. As further described in connection with FIG. 6, each subset of the plurality of subsets may be associated with a corresponding beam (e.g., formed using hardware as described in connection with FIG. 3) of a plurality of beams, and each corresponding beam may be different from remaining beams of the plurality of beams. Additionally, or alternatively, each subset of the plurality of subsets may be associated with a corresponding synchronization signal (e.g., an SSB as described in connection with FIG. 4) of a plurality of synchronization signals, and each corresponding synchronization signal may be different from remaining synchronization signals of the plurality of synchronization signals. In some aspects, each synchronization signal of the plurality of synchronization signals may be associated with a corresponding beam of the plurality of beams, and each corresponding beam may be different from remaining beams of the plurality of beams. Accordingly, the UE 120 may select one of the plurality of beams by, for example, selecting a corresponding one of the plurality of synchronization signals.

As shown in connection with reference number 705, the UE 120 may transmit, and the base station 110 may receive, a random access preamble in a random access occasion that is included within one subset (e.g., one "RO bundle"), of the plurality of subsets. The UE 120 may transmit the random access preamble using the corresponding beam for that subset.

As shown in connection with reference number 710, the base station 110 may perform beam refinement. For example, the base station 110 may narrow or otherwise adjust a reception filter. The base station 110 may perform the refinement because the UE 120 may transmit additional random access preambles in the one subset (e.g., as described in connection with reference number 715) using a same beam that corresponds to the one subset.

As shown in connection with reference number 715, the UE 120 may transmit, and the base station 110 may receive, another random access preamble in another random access occasion that is included within the one subset (e.g., one "RO bundle"), of the plurality of subsets. The UE 120 may transmit the additional random access preamble using the corresponding beam for that subset. In some aspects, the random access preamble and the additional random access preamble may be duplicates of a same random access preamble or otherwise associated with each other (e.g., the random access preamble including one or more portions of data that links the preamble to the additional random access preamble and/or the additional random access preamble including one or more portions of data that links the additional preamble to the random access preamble).

In some aspects, the UE 120 may transmit the additional random access preamble based at least in part on an indication, from the base station 110, to repeat transmissions. The indication may be included in the one or more messages used to configure the set of random access occasions and the plurality of subsets or may be included in a separate message. Additionally, or alternatively, the indication may be included in an RRC message, RMSI, and/or another message.

As shown in connection with reference number 720, the UE 120 may perform beam refinement. For example, the UE 120 may narrow or otherwise adjust a beam used for transmitting to the base station 110. The UE 120 may perform the refinement because the base station 110 is not expecting the UE 120 to transmit random access preambles across different subsets using a same beam.

As shown in connection with reference number 725, the UE 120 may transmit, and the base station 110 may receive, a random access preamble in a random access occasion that is included within another subset (e.g., another "RO bundle"), of the plurality of subsets. The UE 120 may transmit the random access preamble using the corresponding beam for that subset.

As shown in connection with reference number 730, the base station 110 may perform beam refinement. For example, the base station 110 may narrow or otherwise adjust a reception filter. The base station 110 may perform the refinement because the UE 120 may transmit additional random access preambles in the same subset (e.g., as described below in connection with reference number 735) using a same beam that corresponds to that subset.

As shown in connection with reference number 735, the UE 120 may transmit, and the base station 110 may receive, another random access preamble in another random access occasion that is included within the same subset (e.g., the same "RO bundle"), of the plurality of subsets. The UE 120 may transmit the additional random access preamble using the corresponding beam for that subset. In some aspects, the random access preamble and the additional random access preamble may be duplicates of a same random access preamble or otherwise associated with each other (e.g., the random access preamble including one or more portions of data that links the preamble to the additional random access preamble and/or the additional random access preamble including one or more portions of data that links the additional preamble to the random access preamble).

The UE 120 may perform additional beam refinement across additional subsets when the plurality of subsets include more than two subsets. Additionally, or alternatively, the base station 110 may perform additional beam refinement within subsets when the subsets include more than two random access occasions.

In some aspects, the base station 110 may further transmit, and the UE 120 may receive, a random access response (e.g., as described in connection with FIG. 4). In some aspects, the random access response may indicate a beam, of the one or more corresponding beams, to use.

Additionally, in some aspects, the UE 120 may further transmit, and the base station 110 may receive, an additional random access message (e.g., a msg3 as described in connection with FIG. 4). In some aspects, the UE 120 may transmit the additional random access message using a same beam as a beam used for one or more random access preambles. For example, the UE 120 may have transmitted random access preambles within one subset such that the UE 120 selects the corresponding beam for that subset. As an alternative, the UE 120 may transmit the additional random access message using a beam indicated by the random access response (e.g., as described above). For example, the UE 120 may have transmitted random access preambles across subsets such that the base station 110 indicates which beam, of the corresponding beams for those subsets, to use.

By using techniques as described in connection with FIG. 7, the UE 120 can increase reliability and quality of transmissions to the base station 110. Additionally, or alternatively, the base station 110 can increase reliability and quality of receptions at the base station 110.

As indicated above, FIG. 7 is provided as an example. Other examples may differ from what is described with respect to FIG. 7. In some aspects, other examples may include additional random access occasions (e.g., more than four) or fewer random access occasions (e.g., two or three). Additionally, or alternatively, other examples may also include additional subsets and thus additional corresponding beams (e.g., more than two).

Figure 8:
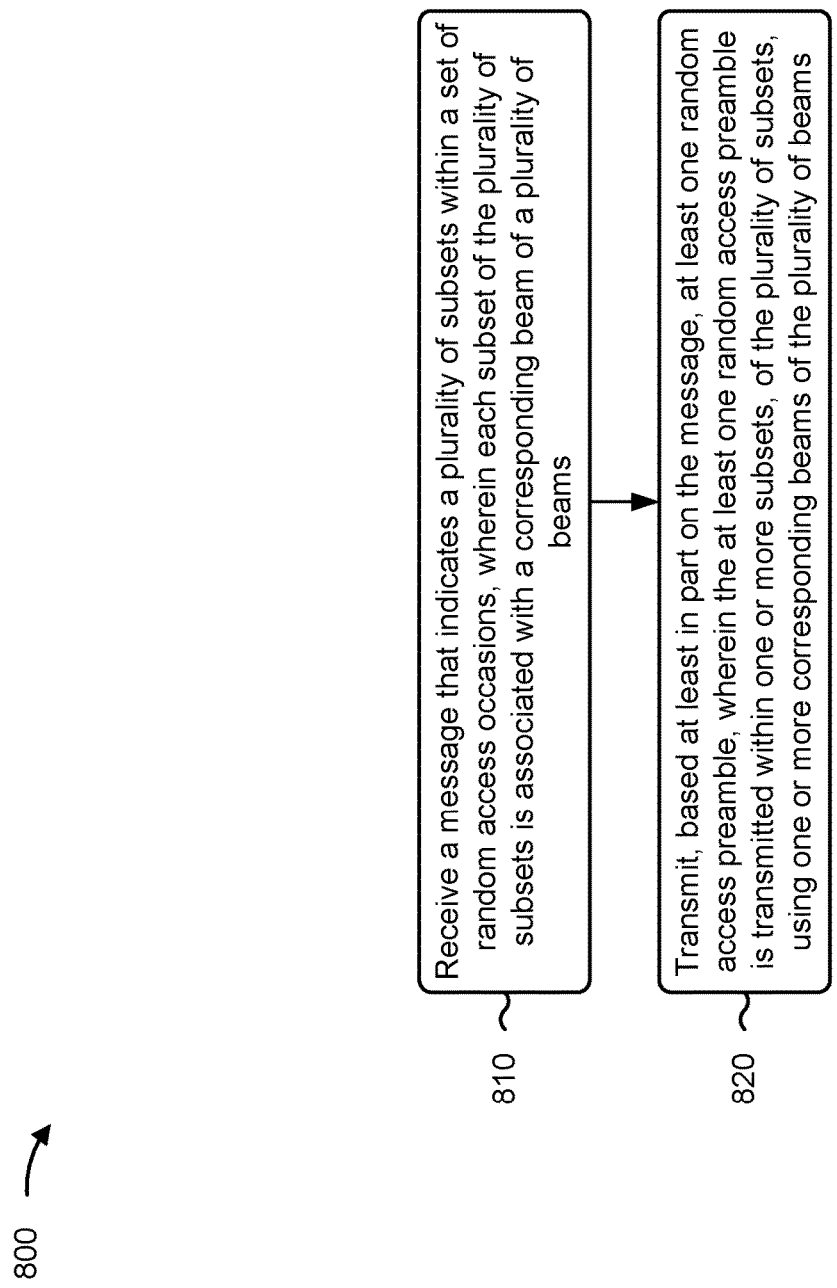
FIGS. 8 and 9 are diagrams illustrating example processes associated with random access occasion bundling, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with random access occasion bundling.

As shown in FIG. 8, in some aspects, process 800 may include receiving, from a base station (e.g., base station 110 and/or apparatus 1100 of FIG. 11), a message that indicates a plurality of subsets within a set of random access occasions (block 810). For example, the UE (e.g., using reception component 1002, depicted in FIG. 10) may receive, from a base station, a message that indicates a plurality of subsets within a set of random access occasions, as described herein. In some aspects, each subset of the plurality of subsets is associated with a corresponding beam of a plurality of beams, and each corresponding beam is different from remaining beams of the plurality of beams.

As further shown in FIG. 8, in some aspects, process 800 may include transmitting, to the base station and based at least in part on the message, at least one random access preamble (block 820). For example, the UE (e.g., using transmission component 1004, depicted in FIG. 10) may transmit, to the base station and based at least in part on the message, at least one random access preamble, as described herein. In some aspects, the at least one random access preamble is transmitted within one or more subsets, of the plurality of subsets, using one or more corresponding beams of the plurality of beams.

Process 800 may include additional aspects, such as any single aspect or any combination of aspects described below and/or in connection with one or more other processes described elsewhere herein.

In a first aspect, each subset of the plurality of subsets is associated with a corresponding beam of the plurality of beams according to a rule stored in the UE.

In a second aspect, alone or in combination with the first aspect, each subset of the plurality of subsets is associated with a corresponding beam of the plurality of beams according to a rule indicated by the message.

In a third aspect, alone or in combination with one or more of the first and second aspects, transmitting the at least one random access preamble includes transmitting a plurality of random access preambles across random access occasions that are included within one subset, of the plurality of subsets.

In a fourth aspect, alone or in combination with one or more of the first through third aspects, the plurality of random access preambles are duplicates of a same random access preamble.

In a fifth aspect, alone or in combination with one or more of the first through fourth aspects, the plurality of random access preambles are associated with each other.

In a sixth aspect, alone or in combination with one or more of the first through fifth aspects, process 800 further includes receiving (e.g., using reception component 1002), from the base station, an indication to repeat transmissions across random access occasions included within one of the plurality of subsets, such that the plurality of random access preambles are transmitted based at least in part on receiving the indication.

In a seventh aspect, alone or in combination with one or more of the first through sixth aspects, the indication is included within RMSI received from the base station.

In an eighth aspect, alone or in combination with one or more of the first through seventh aspects, transmitting the at least one random access preamble includes transmitting a plurality of random access preambles across random access occasions that are included in different subsets of the plurality of subsets.

In a ninth aspect, alone or in combination with one or more of the first through eighth aspects, process 800 further includes transmitting (e.g., using transmission component 1004), to the base station, an additional random access message, where transmitting the at least one random access preamble includes transmitting one or more random access preambles across random access occasions that are included within one subset, of the plurality of subsets, and the additional random access message is transmitted using a same beam as a beam used for the one or more random access preambles.

In a tenth aspect, alone or in combination with one or more of the first through ninth aspects, process 800 further includes receiving (e.g., using reception component 1002), from the base station, a response to the at least one random access preamble, and transmitting (e.g., using transmission component 1004), to the base station, an additional random access message, the additional random access message being transmitted using a beam, of the one or more corresponding beams, indicated by the response to the at least one random access preamble.

In an eleventh aspect, alone or in combination with one or more of the first through tenth aspects, the plurality of subsets are distinct from one or more subsets associated with legacy UEs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
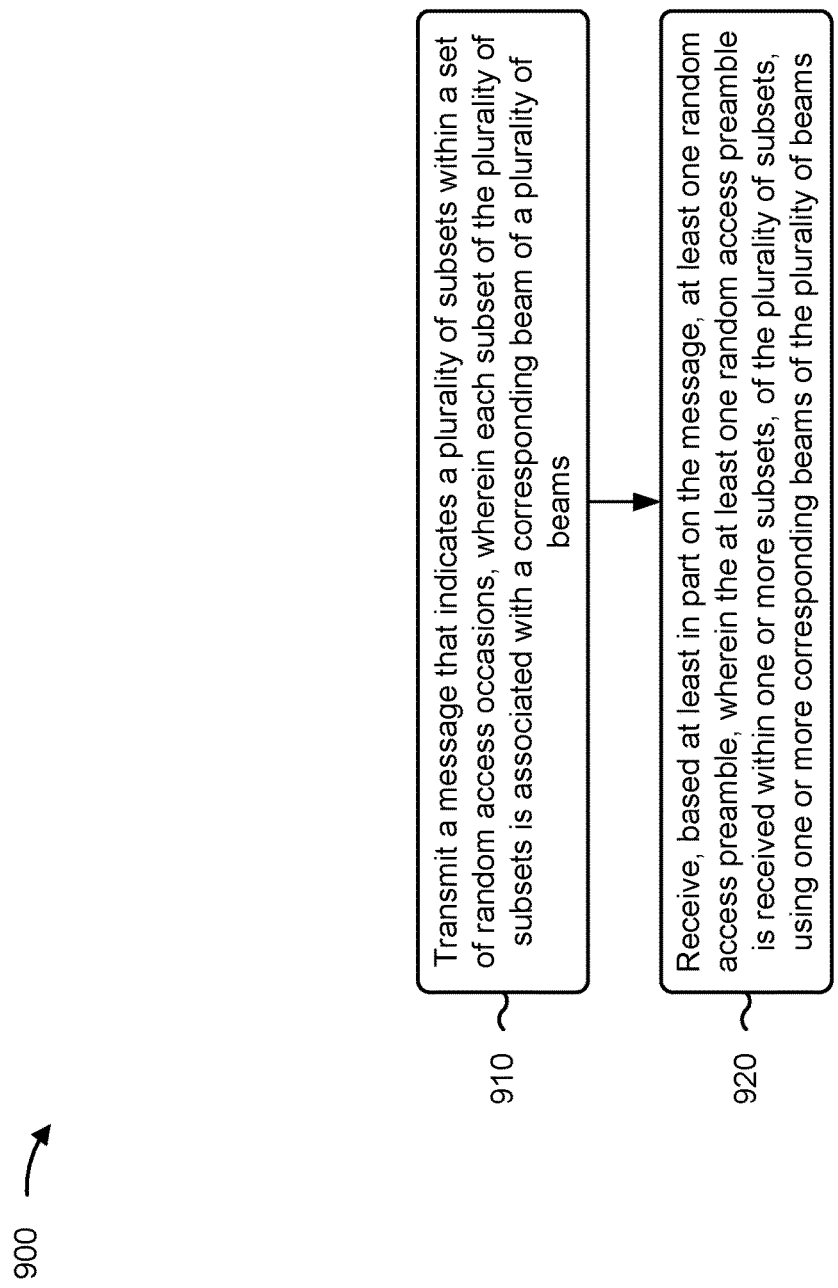

FIG. 9 is a diagram illustrating an example process 900 performed, for example, by a base station, in accordance with the present disclosure. Example process 900 is an example where the base station (e.g., base station 110 and/or apparatus 1100 of FIG. 11) performs operations associated with random access occasion bundling.

As shown in FIG. 9, in some aspects, process 900 may include transmitting, to a UE (e.g., UE 120 and/or apparatus 1000 of FIG. 10), a message that indicates a plurality of subsets within a set of random access occasions (block 910). For example, the base station (e.g., using transmission component 1104, depicted in FIG. 11) may transmit, to a UE, a message that indicates a plurality of subsets within a set of random access occasions, as described herein. In some aspects, each subset of the plurality of subsets is associated with a corresponding beam of a plurality of beams, and each corresponding beam is different from remaining beams of the plurality of beams.

As further shown in FIG. 9, in some aspects, process 900 may include receiving, from the UE and based at least in part on the message, at least one random access preamble (block 920). For example, the base station (e.g., using reception component 1102, depicted in FIG. 11) may receive, from the UE and based at least in part on the message, at least one random access preamble, as described herein. In some aspects, the at least one random access preamble is received within one or more subsets, of the plurality of subsets, using one or more corresponding beams of the plurality of beams.

Process 900 may include additional aspects, such as any single aspect or any combination of aspects described below and/or in connection with one or more other processes described elsewhere herein.

In a first aspect, each subset of the plurality of subsets is associated with a corresponding beam of the plurality of beams according to a rule stored in the base station.

In a second aspect, alone or in combination with the first aspect, each subset of the plurality of subsets is associated with a corresponding beam of the plurality of beams according to a rule indicated by the message.

In a third aspect, alone or in combination with one or more of the first and second aspects, receiving the at least one random access preamble includes receiving a plurality of random access preambles across random access occasions that are included within one subset, of the plurality of subsets.

In a fourth aspect, alone or in combination with one or more of the first through third aspects, the plurality of random access preambles are duplicates of a same random access preamble.

In a fifth aspect, alone or in combination with one or more of the first through fourth aspects, the plurality of random access preambles are associated with each other.

In a sixth aspect, alone or in combination with one or more of the first through fifth aspects, process 900 further includes transmitting (e.g., using transmission component 1104), to the UE, an indication to repeat transmissions across random access occasions included within one of the plurality of subsets, such that the plurality of random access preambles are received based at least in part on transmitting the indication.

In a seventh aspect, alone or in combination with one or more of the first through sixth aspects, the indication is included within RMSI transmitted to the UE.

In an eighth aspect, alone or in combination with one or more of the first through seventh aspects, receiving the at least one random access preamble includes receiving a plurality of random access preambles across random access occasions that are included in different subsets of the plurality of subsets.

In a ninth aspect, alone or in combination with one or more of the first through eighth aspects, process 900 further includes receiving (e.g., using reception component 1102), from the UE, an additional random access message, where receiving the at least one random access preamble includes receiving one or more random access preambles across random access occasions that are included within one subset, of the plurality of subsets, and the additional random access message is received using a same beam as a beam used for the one or more random access preambles.

In a tenth aspect, alone or in combination with one or more of the first through ninth aspects, process 900 further includes transmitting (e.g., using transmission component 1104), to the UE, a response to the at least one random access preamble, and receiving (e.g., using reception component 1102), from the UE, an additional random access message, the additional random access message being received using a beam, of the one or more corresponding beams, indicated by the response to the at least one random access preamble.

In an eleventh aspect, alone or in combination with one or more of the first through tenth aspects, the plurality of subsets are distinct from one or more subsets associated with legacy UEs.

In a twelfth aspect, alone or in combination with one or more of the first through eleventh aspects, process 900 further includes receiving (e.g., using reception component 1102), from a legacy UE, an additional random access preamble, the additional random access preamble being associated with a beam, and the at least one random access preamble and the additional random access preamble being received using a combination of a subbeam, based at least in part on the one or more corresponding beams, with the beam associated with the additional random access preamble.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
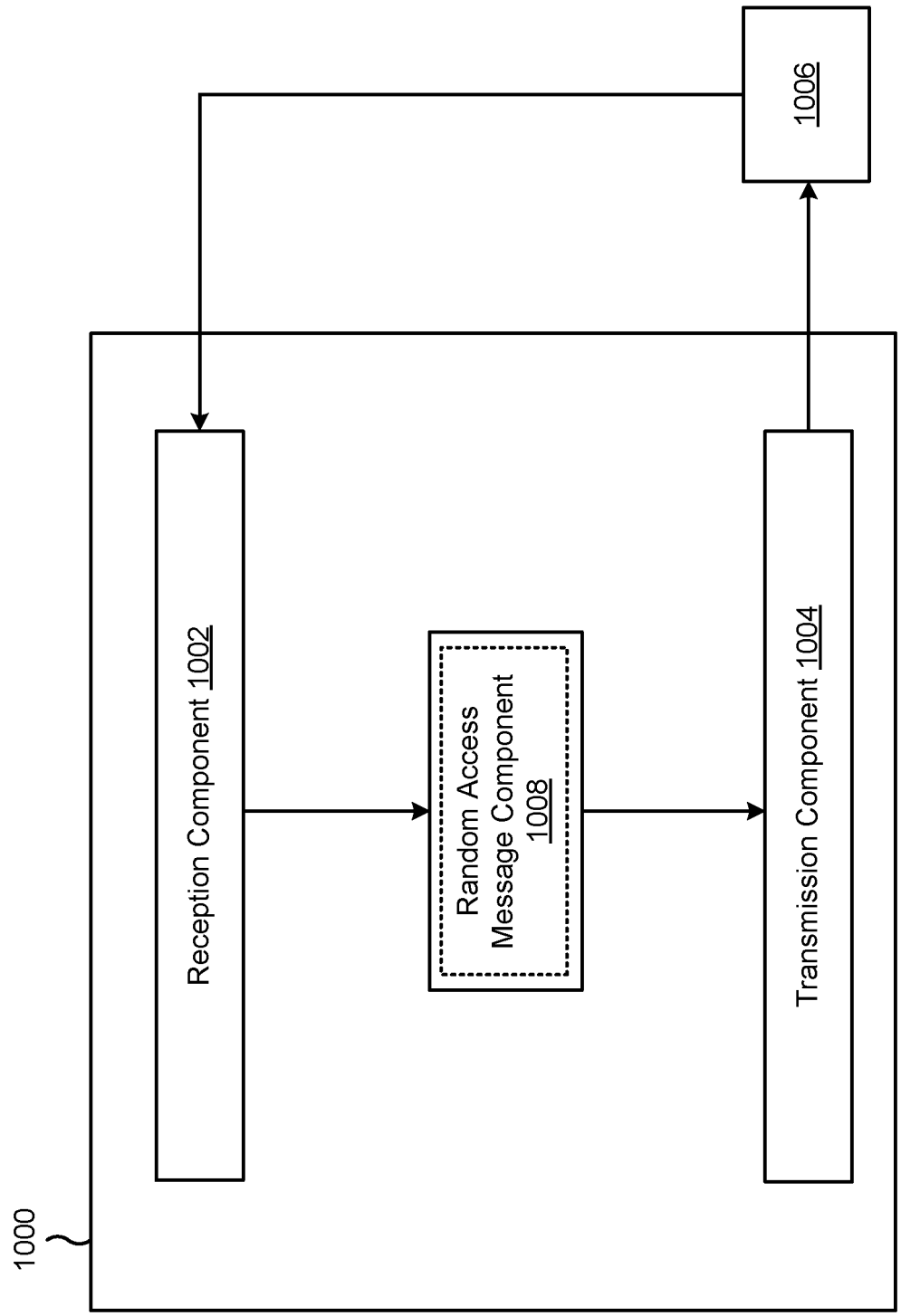
FIGS. 10 and 11 are diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a random access message component 1008, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the reception component 1002 may receive, from the apparatus 1006, a message that indicates a plurality of subsets within a set of random access occasions. Each subset of the plurality of subsets may be associated with a corresponding beam of a plurality of beams, and each corresponding beam may be different from remaining beams of the plurality of beams. Accordingly, the transmission component 1004 may transmit, to the apparatus 1006 and based at least in part on the message, at least one random access preamble. For example, the random access message component 1008 may encode the at least one random access preamble for the transmission component 1004 to transmit. In some aspects, the random access message component 1008 may include a modulator, a transmit MIMO processor, a transmit processor, a controller/processor, a memory, or a combination thereof, of the UE described above in connection with FIG. 2. The transmission component 1004 may transmit the at least one random access preamble within one or more subsets, of the plurality of subsets, using one or more corresponding beams of the plurality of beams.

In some aspects, the reception component 1002 may further receive, from the apparatus 1006, an indication to repeat transmissions across random access occasions included within one of the plurality of subsets. Accordingly, the transmission component 1004 may transmit a plurality of random access preambles, across the random access occasions included within the one subset, based at least in part on the reception component 1002 receiving the indication. Additionally, or alternatively, the transmission component 1004 may transmit a plurality of random access preambles across random access occasions included within different subsets.

In some aspects, the reception component 1002 may receive, from the apparatus 1006, a response to the at least one random access preamble. In some aspects, the transmission component 1004 may transmit, to the apparatus 1006, an additional random access message. The transmission component 1004 may transmit the additional random access message using a same beam as a beam used for one or more random access preambles transmitted across random access occasions that are included within one subset, of the plurality of subsets. As an alternative, the transmission component 1004 may transmit the additional random access message using a beam, of the one or more corresponding beams, indicated by the response to the at least one random access preamble.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
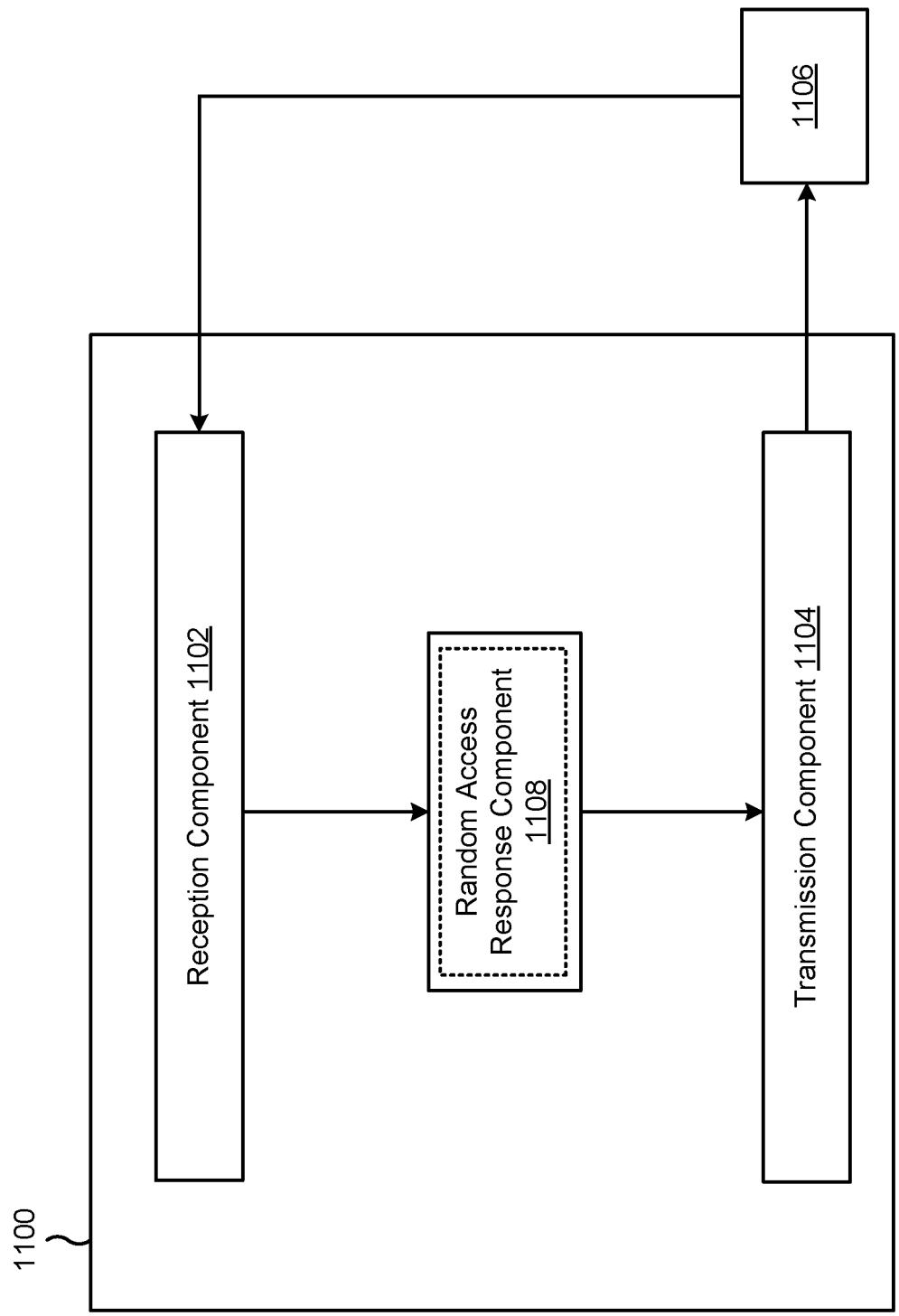

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a random access response component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

In some aspects, the transmission component 1104 may transmit, to the apparatus 1106, a message that indicates a plurality of subsets within a set of random access occasions. Each subset of the plurality of subsets may be associated with a corresponding beam of a plurality of beams, and each corresponding beam may be different from remaining beams of the plurality of beams. Accordingly, the reception component 1102 may receive, from the apparatus 1106 and based at least in part on the message, at least one random access preamble. The reception component 1102 may receive the at least one random access preamble within one or more subsets, of the plurality of subsets, using one or more corresponding beams of the plurality of beams.

In some aspects, the transmission component 1104 may transmit, to the apparatus 1106, an indication to repeat transmissions across random access occasions included within one of the plurality of subsets. Accordingly, the reception component 1102 may receive the plurality of random access preambles, across the random access occasions included within the one subset, based at least in part on the transmission component 1104 transmitting the indication. Additionally, or alternatively, the reception component 1102 may receive a plurality of random access preambles across random access occasions included within different subsets.

In some aspects, the transmission component 1104 may transmit, to the apparatus 1106, a response to the at least one random access preamble. For example, the random access response component 1108 may encode the response for the transmission component 1104 to transmit. In some aspects, the random access response component 1108 may include a modulator, a transmit MIMO processor, a transmit processor, a controller/processor, a memory, or a combination thereof, of the base station described above in connection with FIG. 2.

In some aspects, the reception component 1102 may receive, from the apparatus 1106, an additional random access message. The reception component 1102 may receive the additional random access message using a same beam as a beam used for one or more random access preambles received across random access occasions that are included within one subset, of the plurality of subsets. As an alternative, the reception component 1102 may receive the additional random access message using a beam, of the one or more corresponding beams, indicated by the response to the at least one random access preamble.

In some aspects, the reception component 1102 may receive, from a legacy apparatus (e.g., a legacy UE), an additional random access preamble. Accordingly, the reception component 1102 may receive the additional random access preamble and the at least one random access preamble using a combination of a subbeam, based at least in part on the one or more corresponding beams, with a beam associated with the additional random access preamble.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, a message that indicates a plurality of subsets within a set of random access occasions, wherein each subset of the plurality of subsets is associated with a corresponding beam of a plurality of beams, wherein each corresponding beam is different from remaining beams of the plurality of beams; and transmitting, to the base station and based at least in part on the message, at least one random access preamble, wherein the at least one random access preamble is transmitted within one or more subsets, of the plurality of subsets, using one or more corresponding beams of the plurality of beams.

Aspect 2: The method of Aspect 1, wherein each subset of the plurality of subsets is associated with a corresponding beam of the plurality of beams according to a rule stored in the UE.

Aspect 3: The method of any of Aspects 1 through 2, wherein each subset of the plurality of subsets is associated with a corresponding beam of the plurality of beams according to a rule indicated by the message.

Aspect 4: The method of any of Aspects 1 through 3, wherein transmitting the at least one random access preamble comprises transmitting a plurality of random access preambles across random access occasions that are included within one subset, of the plurality of subsets.

Aspect 5: The method of Aspect 4, wherein the plurality of random access preambles are duplicates of a same random access preamble.

Aspect 6: The method of Aspect 4, wherein the plurality of random access preambles are associated with each other.

Aspect 7: The method of any of Aspects 4 through 6, further comprising: receiving, from the base station, an indication to repeat transmissions across random access occasions included within one of the plurality of subsets, wherein the plurality of random access preambles are transmitted based at least in part on receiving the indication.

Aspect 8: The method of Aspect 7, wherein the indication is included within remaining minimum system information (RMSI) received from the base station.

Aspect 9: The method of any of Aspects 1 through 8, wherein transmitting the at least one random access preamble comprises transmitting a plurality of random access preambles across random access occasions that are included in different subsets of the plurality of subsets.

Aspect 10: The method of Aspect 9, wherein the plurality of random access preambles are duplicates of a same random access preamble.

Aspect 11: The method of Aspect 9, wherein the plurality of random access preambles are associated with each other.

Aspect 12: The method of any of Aspects 1 through 11, further comprising: transmitting, to the base station, an additional random access message, wherein transmitting the at least one random access preamble comprises transmitting one or more random access preambles across random access occasions that are included within one subset, of the plurality of subsets, and wherein the additional random access message is transmitted using a same beam as a beam used for the one or more random access preambles.

Aspect 13: The method of any of Aspects 1 through 12, further comprising: receiving, from the base station, a response to the at least one random access preamble; and transmitting, to the base station, an additional random access message, wherein the additional random access message is transmitted using a beam, of the one or more corresponding beams, indicated by the response to the at least one random access preamble.

Aspect 14: The method of any of Aspects 1 through 13, wherein the plurality of subsets are distinct from one or more subsets associated with legacy UEs.

Aspect 15: A method of wireless communication performed by a base station, comprising: transmitting, to a user equipment (UE), a message that indicates a plurality of subsets within a set of random access occasions, wherein each subset of the plurality of subsets is associated with a corresponding beam of a plurality of beams, wherein each corresponding beam is different from remaining beams of the plurality of beams; and receiving, from the UE and based at least in part on the message, at least one random access preamble, wherein the at least one random access preamble is received within one or more subsets, of the plurality of subsets, using one or more corresponding beams of the plurality of beams.

Aspect 16: The method of Aspect 15, wherein each subset of the plurality of subsets is associated with a corresponding beam of the plurality of beams according to a rule stored in the base station.

Aspect 17: The method of any of Aspects 15 through 16, wherein each subset of the plurality of subsets is associated with a corresponding beam of the plurality of beams according to a rule indicated by the message.

Aspect 18: The method of any of Aspects 15 through 17, wherein receiving the at least one random access preamble comprises receiving a plurality of random access preambles across random access occasions that are included within one subset, of the plurality of subsets.

Aspect 19: The method of Aspect 18, wherein the plurality of random access preambles are duplicates of a same random access preamble.

Aspect 20: The method of Aspect 18, wherein the plurality of random access preambles are associated with each other.

Aspect 21: The method of any of Aspects 18 through 20, further comprising: transmitting, to the UE, an indication to repeat transmissions across random access occasions included within one of the plurality of subsets, wherein the plurality of random access preambles are received based at least in part on transmitting the indication.

Aspect 22: The method of Aspect 21, wherein the indication is included within remaining minimum system information (RMSI) transmitted to the UE.

Aspect 23: The method of any of Aspects 15 through 22, wherein receiving the at least one random access preamble comprises receiving a plurality of random access preambles across random access occasions that are included in different subsets of the plurality of subsets.

Aspect 24: The method of Aspect 23, wherein the plurality of random access preambles are duplicates of a same random access preamble.

Aspect 25: The method of Aspect 23, wherein the plurality of random access preambles are associated with each other.

Aspect 26: The method of any of Aspects 15 through 25, further comprising: receiving, from the UE, an additional random access message, wherein receiving the at least one random access preamble comprises receiving one or more random access preambles across random access occasions that are included within one subset, of the plurality of subsets, and wherein the additional random access message is received using a same beam as a beam used for the one or more random access preambles.

Aspect 27: The method of any of Aspects 15 through 26, further comprising: transmitting, to the UE, a response to the at least one random access preamble; and receiving, from the UE, an additional random access message, wherein the additional random access message is received using a beam, of the one or more corresponding beams, indicated by the response to the at least one random access preamble.

Aspect 28: The method of any of Aspects 15 through 27, wherein the plurality of subsets are distinct from one or more subsets associated with legacy UEs.

Aspect 29: The method of any of Aspects 15 through 28, further comprising: receiving, from a legacy UE, an additional random access preamble, wherein the additional random access preamble is associated with a beam, and wherein the at least one random access preamble and the additional random access preamble are received using a combination of a subbeam, based at least in part on the one or more corresponding beams, with the beam associated with the additional random access preamble.

Aspect 30: An apparatus for wireless communication at a device, comprising a processor; memory coupled with the processor; and instructions stored in the memory and executable by the processor to cause the apparatus to perform the method of one or more of Aspects 1-14.

Aspect 31: A device for wireless communication, comprising a memory and one or more processors coupled to the memory, the one or more processors configured to perform the method of one or more of Aspects 1-14.

Aspect 32: An apparatus for wireless communication, comprising at least one means for performing the method of one or more of Aspects 1-14.

Aspect 33: A non-transitory computer-readable medium storing code for wireless communication, the code comprising instructions executable by a processor to perform the method of one or more of Aspects 1-14.

Aspect 34: A non-transitory computer-readable medium storing a set of instructions for wireless communication, the set of instructions comprising one or more instructions that, when executed by one or more processors of a device, cause the device to perform the method of one or more of Aspects 1-14.

Aspect 35: An apparatus for wireless communication at a device, comprising a processor; memory coupled with the processor; and instructions stored in the memory and executable by the processor to cause the apparatus to perform the method of one or more of Aspects 15-29.

Aspect 36: A device for wireless communication, comprising a memory and one or more processors coupled to the memory, the one or more processors configured to perform the method of one or more of Aspects 15-29.

Aspect 37: An apparatus for wireless communication, comprising at least one means for performing the method of one or more of Aspects 15-29.

Aspect 38: A non-transitory computer-readable medium storing code for wireless communication, the code comprising instructions executable by a processor to perform the method of one or more of Aspects 15-29.

Aspect 39: A non-transitory computer-readable medium storing a set of instructions for wireless communication, the set of instructions comprising one or more instructions that, when executed by one or more processors of a device, cause the device to perform the method of one or more of Aspects 15-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive, from a base station, a message that indicates a plurality of subsets within a set of random access occasions, wherein each subset of the plurality of subsets comprises a plurality of random access occasions and is associated with a corresponding beam of a plurality of beams, wherein each corresponding beam is different from remaining beams of the plurality of beams; and
      transmit, to the base station and based at least in part on the message, at least one random access preamble, wherein the at least one random access preamble is transmitted within one or more subsets, of the plurality of subsets, using one or more corresponding beams of the plurality of beams.

2. The apparatus of claim 1, wherein each subset of the plurality of subsets is associated with a corresponding beam of the plurality of beams according to a rule stored in the UE.

3. The apparatus of claim 1, wherein each subset of the plurality of subsets is associated with a corresponding beam of the plurality of beams according to a rule indicated by the message.

4. The apparatus of claim 1, wherein the one or more processors, to transmit the at least one random access preamble, are configured to transmit a plurality of random access preambles across random access occasions that are included within one subset, of the plurality of subsets.

5. The apparatus of claim 4, wherein the plurality of random access preambles are duplicates of a same random access preamble.

6. The apparatus of claim 4, wherein the plurality of random access preambles are associated with each other.

7. The apparatus of claim 4, wherein the one or more processors are further configured to:
   receive, from the base station, an indication to repeat transmissions across random access occasions included within one of the plurality of subsets,
   wherein the plurality of random access preambles are transmitted based at least in part on receiving the indication.

8. The apparatus of claim 7, wherein the indication is included within remaining minimum system information (RMSI) received from the base station.

9. The apparatus of claim 1, wherein the one or more processors, to transmit the at least one random access preamble, are configured to transmit a plurality of random access preambles across random access occasions that are included in different subsets of the plurality of subsets.

10. The apparatus of claim 9, wherein the plurality of random access preambles are duplicates of a same random access preamble.

11. The apparatus of claim 9, wherein the plurality of random access preambles are associated with each other.

12. The apparatus of claim 1, wherein the one or more processors are further configured to:
   transmit, to the base station, an additional random access message,
   wherein the one or more processors, to transmit the at least one random access preamble, are configured to transmit one or more random access preambles across random access occasions that are included within one subset, of the plurality of subsets, and wherein the additional random access message is transmitted using a same beam as a beam used for the one or more random access preambles.

13. The apparatus of claim 1, wherein the one or more processors are further configured to:
   receive, from the base station, a response to the at least one random access preamble; and
   transmit, to the base station, an additional random access message,
   wherein the additional random access message is transmitted using a beam, of the one or more corresponding beams, indicated by the response to the at least one random access preamble.

14. The apparatus of claim 1, wherein the plurality of subsets are distinct from one or more subsets associated with legacy UEs.

15. An apparatus for wireless communication at a base station, comprising:
   a memory; and
   one or more processors, coupled to the memory, configured to:
      transmit, to a user equipment (UE), a message that indicates a plurality of subsets within a set of random access occasions, wherein each subset of the plurality of subsets comprises a plurality of random access occasions and is associated with a corresponding beam of a plurality of beams, wherein each corresponding beam is different from remaining beams of the plurality of beams; and
      receive, from the UE and based at least in part on the message, at least one random access preamble, wherein the at least one random access preamble is received within one or more subsets, of the plurality of subsets, using one or more corresponding beams of the plurality of beams.

16. The apparatus of claim 15, wherein each subset of the plurality of subsets is associated with a corresponding beam of the plurality of beams according to a rule stored in the base station.

17. The apparatus of claim 15, wherein each subset of the plurality of subsets is associated with a corresponding beam of the plurality of beams according to a rule indicated by the message.

18. The apparatus of claim 15, wherein the one or more processors, to receive the at least one random access preamble, are configured to receive a plurality of random access preambles across random access occasions that are included within one subset, of the plurality of subsets.

19. The apparatus of claim 18, wherein the plurality of random access preambles are duplicates of a same random access preamble.

20. The apparatus of claim 18, wherein the plurality of random access preambles are associated with each other.

21. The apparatus of claim 18, wherein the one or more processors are further configured to:
   transmit, to the UE, an indication to repeat transmissions across random access occasions included within one of the plurality of subsets,
   wherein the plurality of random access preambles are received based at least in part on transmitting the indication.

22. The apparatus of claim 21, wherein the indication is included within remaining minimum system information (RMSI) transmitted to the UE.

23. The apparatus of claim 15, wherein the one or more processors, to receive the at least one random access preamble, are configured to receive a plurality of random access preambles across random access occasions that are included in different subsets of the plurality of subsets.

24. The apparatus of claim 23, wherein the plurality of random access preambles are duplicates of a same random access preamble.

25. The apparatus of claim 23, wherein the plurality of random access preambles are associated with each other.

26. The apparatus of claim 15, wherein the one or more processors are further configured to:
receive, from the UE, an additional random access message,
wherein the one or more processors, to receive the at least one random access preamble, are configured to receive one or more random access preambles across random access occasions that are included within one subset, of the plurality of subsets, and wherein the additional random access message is received using a same beam as a beam used for the one or more random access preambles.

27. The apparatus of claim 15, wherein the one or more processors are further configured to:
transmit, to the UE, a response to the at least one random access preamble; and
receive, from the UE, an additional random access message,
wherein the additional random access message is received using a beam, of the one or more corresponding beams, indicated by the response to the at least one random access preamble.

28. The apparatus of claim 15, wherein the one or more processors are further configured to:
receive, from a legacy UE, an additional random access preamble,
wherein the additional random access preamble is associated with a beam, and wherein the at least one random access preamble and the additional random access preamble are received using a combination of a sub-beam, based at least in part on the one or more corresponding beams, with the beam associated with the additional random access preamble.

29. A method of wireless communication performed by a user equipment (UE), comprising:
receiving, from a base station, a message that indicates a plurality of subsets within a set of random access occasions, wherein each subset of the plurality of subsets comprises a plurality of random access occasions and is associated with a corresponding beam of a plurality of beams, wherein each corresponding beam is different from remaining beams of the plurality of beams; and
transmitting, to the base station and based at least in part on the message, at least one random access preamble, wherein the at least one random access preamble is transmitted within one or more subsets, of the plurality of subsets, using one or more corresponding beams of the plurality of beams.

30. A method of wireless communication performed by a base station, comprising:
transmitting, to a user equipment (UE), a message that indicates a plurality of subsets within a set of random access occasions, wherein each subset of the plurality of subsets comprises a plurality of random access occasions and is associated with a corresponding beam of a plurality of beams, wherein each corresponding beam is different from remaining beams of the plurality of beams; and
receiving, from the UE and based at least in part on the message, at least one random access preamble, wherein the at least one random access preamble is received within one or more subsets, of the plurality of subsets, using one or more corresponding beams of the plurality of beams.

* * * * *